(12) United States Patent
Müller

(10) Patent No.: US 7,458,560 B2
(45) Date of Patent: Dec. 2, 2008

(54) DIAPHRAGM VALVE

(75) Inventor: Fritz Müller, Ingelfingen (DE)

(73) Assignee: GEMÜ Gebrüder Müller Apparatebau GmbH & Co. KG, Ingelfingen (DE)

( * ) Notice: Subject to any disclaimer, the term of this patent is extended or adjusted under 35 U.S.C. 154(b) by 0 days.

(21) Appl. No.: 11/279,171

(22) Filed: Apr. 10, 2006

(65) Prior Publication Data

US 2006/0226392 A1    Oct. 12, 2006

(30) Foreign Application Priority Data

Apr. 11, 2005   (DE) .................. 10 2005 016 600

(51) Int. Cl.
*F16K 1/00* (2006.01)
*F16K 15/00* (2006.01)

(52) U.S. Cl. ...................... 251/333; 251/331
(58) Field of Classification Search ............... 251/331, 251/333, 334; 137/242
See application file for complete search history.

(56) References Cited

U.S. PATENT DOCUMENTS

| | | | | | |
|---|---|---|---|---|---|
| 2,716,017 | A | * | 8/1955 | Linker | 251/331 |
| 2,963,266 | A | * | 12/1960 | Boteler | 251/331 |
| 3,067,764 | A | * | 12/1962 | Geary | 137/315.04 |
| 3,103,342 | A | * | 9/1963 | Boteler | 251/331 |
| 5,123,439 | A | * | 6/1992 | Powers | 137/375 |

* cited by examiner

*Primary Examiner*—John K Fristoe, Jr.
(74) *Attorney, Agent, or Firm*—Henry M. Feiereisen; Ursula B. Day

(57) ABSTRACT

A diaphragm valve includes a valve body defining a passageway constructed to form a valve seat, and a diaphragm. A compressor moves the diaphragm between a closing position in which a flow of fluid through the passageway is barred as the diaphragm is caused by the compressor to seal the valve seat, and an open position in which at least part of a cross section of the passageway is bounded by the diaphragm to thereby enable a flow of fluid through the passageway substantially without narrowing the cross section of the passageway.

16 Claims, 4 Drawing Sheets

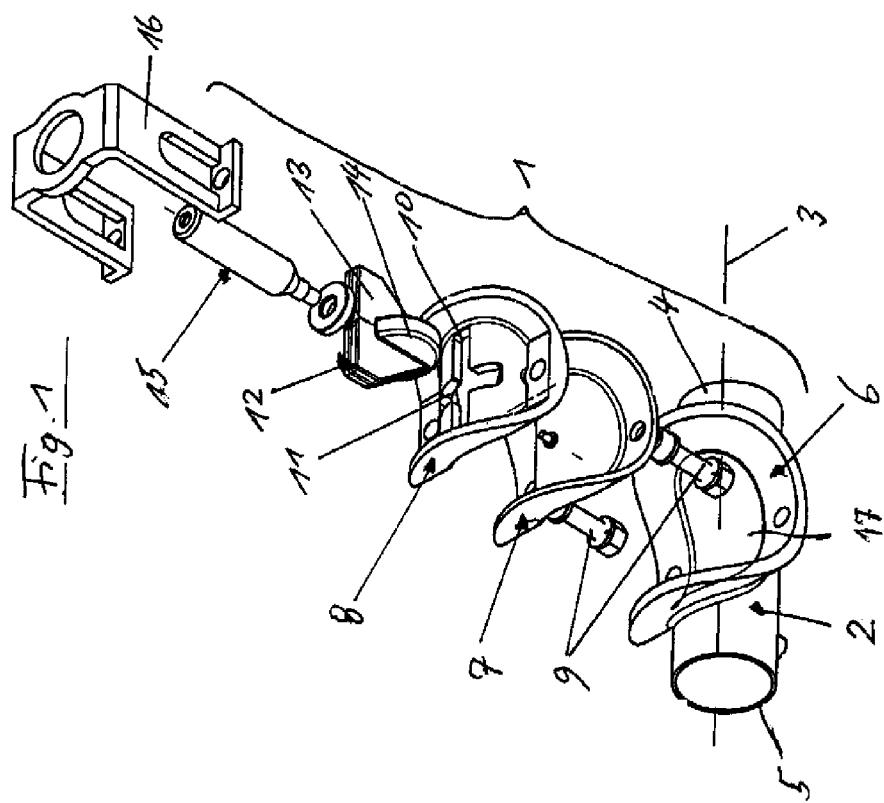
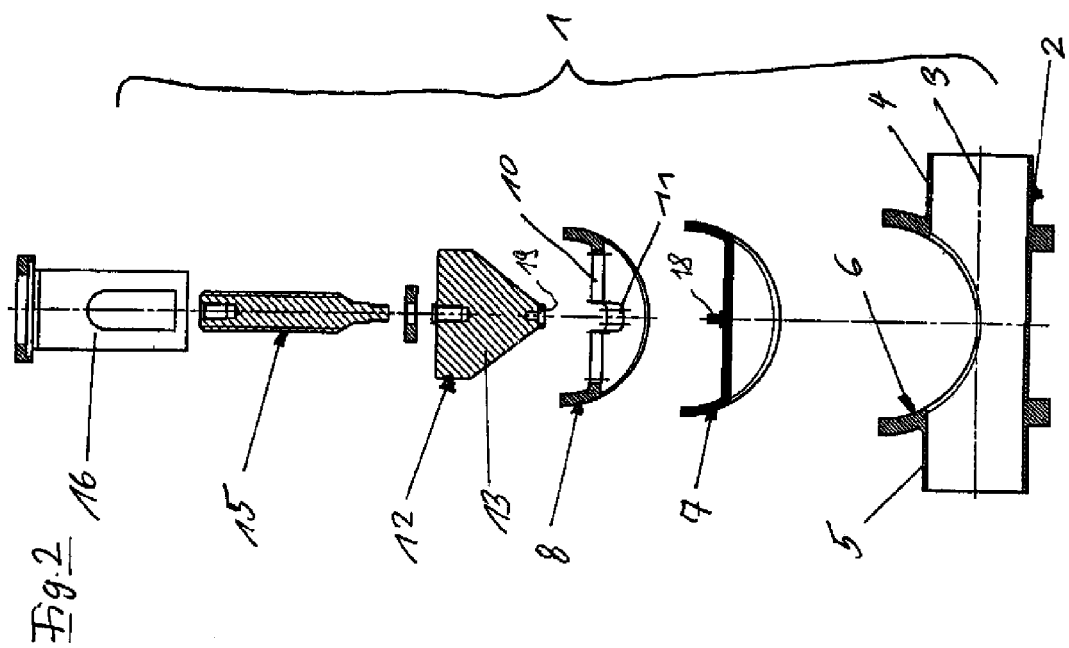

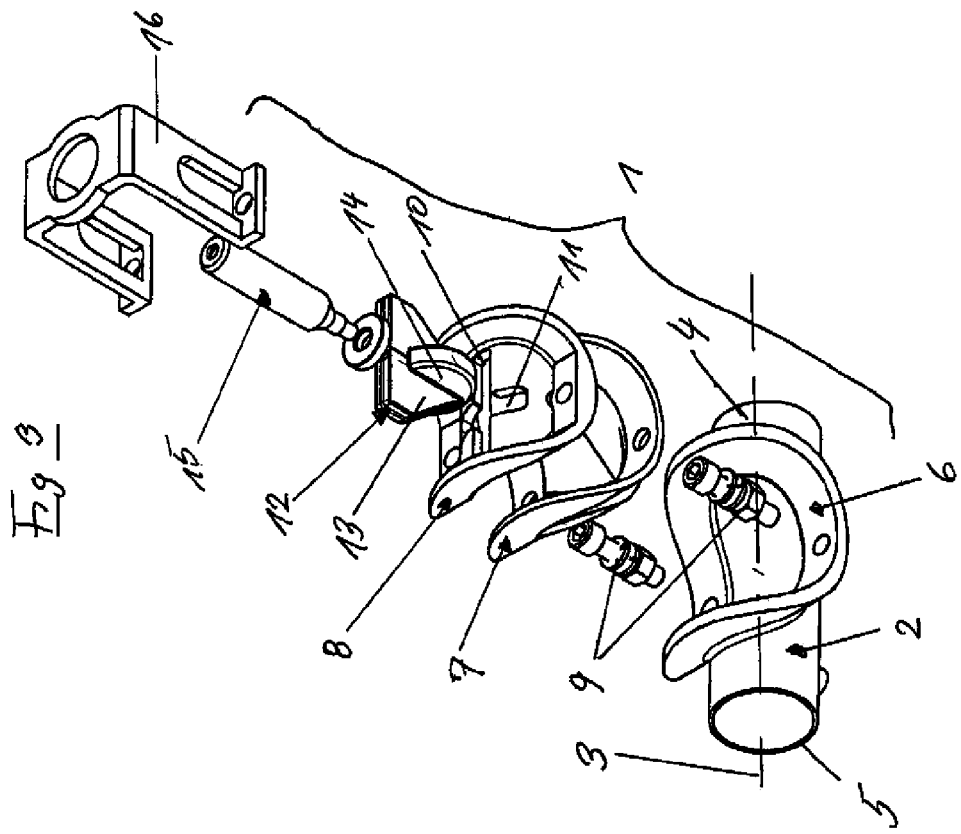
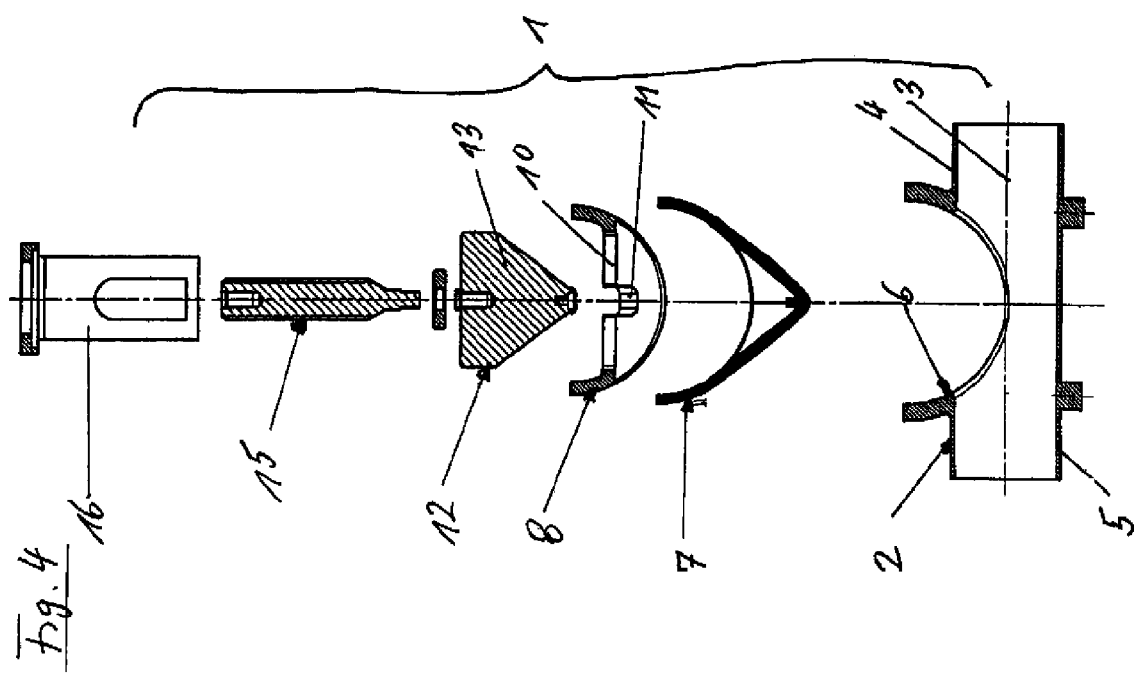

DIAPHRAGM VALVE

CROSS-REFERENCES TO RELATED APPLICATIONS

This application claims the priority of German Patent Application, Serial No. 10 2005 016 600.8, filed Apr. 11, 2005, pursuant to 35 U.S.C. 119(a)-(d), the content of which is incorporated herein by reference.

BACKGROUND OF THE INVENTION

The present invention relates, in general, to a diaphragm valve for control of flow of a fluid through a pipe.

Nothing in the following discussion of the state of the art is to be construed as an admission of prior art.

A diaphragm valve typically includes a valve body forming a valve seat in the form of a web for example. A compressor which can be actuated by a valve stem is provided for operating a diaphragm between a closing position in which the diaphragm is pressed against the valve seat to inhibit a flow of fluid through the pipe, and an open position, in which the diaphragm is detached from the valve seat to allow a fluid flow.

Diaphragm valves while finding application in many fields are unsuitable when a flow of sensitive fluids is involved, like in the food and pharmaceutical industries because the fluid-carrying passageways cannot be cleaned thoroughly and completely enough by means of cleaning bodies, also called "scrapers" to meet hygienic standards. In order to meet these stringent requirement, the cleaning body must be able to pass also the valve region, in particular the area of the diaphragm, without being obstructed by projecting parts such as valve seats or the like. In other words, the cross section of the fluid passageways and in the area of the diaphragm valve must be substantially clear. Because of the presence of projecting parts, conventional diaphragm valves do not permit an unhindered passage of such cleaning bodies.

It would therefore be desirable and advantageous to provide an improved diaphragm valve which obviates prior art shortcomings and allows an unhindered passage of cleaning bodies and which is simple in construction while being reliable in operation and cost-efficient.

SUMMARY OF THE INVENTION

According to one aspect of the present invention, a diaphragm valve includes a valve body defining a passageway constructed to form a valve seat, a diaphragm, and a compressor for moving the diaphragm between a closing position in which a flow of fluid through the passageway is barred as the diaphragm is caused by the compressor to seal the valve seat, and an open position in which at least part of a cross section of the passageway is bounded by the diaphragm to thereby enable a flow of fluid through the passageway substantially without narrowing the cross section of the passageway.

The present invention resolves prior art problems by constructing the diaphragm valve in such a manner that in open position, the cross section of the passageway is defined and bounded in part by the valve body and in part by a side of the diaphragm. As a result, cleaning bodies can be advanced through the passageway unimpeded also through the area of the diaphragm valve. There are no obstructions caused by valve webs, valve disks, flaps, gates, stems, or the like, that could hinder a clear passage. Thus, application of a diaphragm valve according to the present invention is now possible in the food and pharmaceutical industries as the pipe and pipe wall as well as the area of the diaphragm valve can be complete and thoroughly cleaned to satisfy the stringent demands and standards as far as hygiene and contamination are concerned. In the closing position of the diaphragm valve, the diaphragm is deflected by the compressor in such a way that the diaphragm is urged against the valve seat formed by the passageway of the valve body. In other words, the passageway cross section of the valve body itself is hereby used as valve seat for the diaphragm in the closing position. The diaphragm valve is substantially free of dead space as the compressor acts on the diaphragm from outside, i.e. from the fluid-distal side, and realizes an effective seal in cooperation with the valve body in the closing position.

According to another feature of the present invention, the valve body may have a holder for supporting the diaphragm, with the holder having a configuration in the shape of a saddle, e.g. in the shape of a rolling "S", in a direction of a length axis of the passageway. A housing part may be provided for completing the cross section of the passageway and circumscribing the diaphragm on a fluid-distal side of the holder. As a result, the diaphragm is clamped between the holder of the valve body and the surrounding housing part, whereby the diaphragm may also have a saddle-like configuration similar to the holder configuration so that in the open position of the diaphragm valve, part of the passageway is bounded by the diaphragm itself. The diaphragm is hereby held securely and stably between the holder and the housing part to retain its shape, whereby the housing part may have an arched configuration to match the cross section of the passageway. In other words, when intersecting the diaphragm valve in open position, the cross section of the passageway is substantially continued in the area of the diaphragm valve for fluid flow.

According to another feature of the present invention, the compressor and the housing part can be constructed to secure the compressor against rotation when the compressor operates the diaphragm to move between the open and closing positions. In this way, the diaphragm is always acted upon by a predetermined part of the compressor to deflect the diaphragm in the closing position and thereby press the diaphragm snugly against the inner wall of the valve body. The guidance of the compressor on the housing part also provides easy mobility of the compressor to respectively move the diaphragm valve between the open and closing positions. To secure the compressor against rotation, the housing part may be formed with a slit arrangement comprised of at least two slits which extend perpendicular to one another for receiving the compressor. As a result, the compressor is guided reliably in two planes perpendicular to one another while moving between the open and closing positions so that the movement pattern can be accurately reproduced during actuation of the diaphragm valve and movement of the compressor to improve operation.

According to another feature of the present invention, at least one of the slits of the slit arrangement may extend approximately in the direction of the length axis. As a result, the compressor is effectively guided during its movement in length axis direction as well as perpendicular thereto.

According to another feature of the present invention, the compressor is constructed to have an effective zone interacting with the diaphragm such that the diaphragm is urged in the closing position against an inner wall surface of the passageway. In this way, the diaphragm bears circumferentially flatly against the passageway of the valve body in the closing position to thereby provide a tight seal and prevent a flow of fluid through the passageway, even after prolonged repeated use.

According to another feature of the present invention, the effective zone of the compressor may have a configuration which matches a configuration of the cross section of the passageway. Thus, the shape of the diaphragm conforms circumferentially to the inner wall of the valve body to ensure an effective sealing action, when the diaphragm valve is in closing position.

According to another feature of the present invention, the effective zone of the compressor may be constructed to have a wedge-shaped portion for flat contact upon the diaphragm. Deformation forces are thus applied by the compressor onto the diaphragm across a wider area to thereby eliminate undesired stress or force concentrations.

According to another feature of the present invention, the effective zone of the compressor may be constructed to have a projecting circular segment to complement the cross section of the passageway. This configuration is advantageous especially when the cross section of the passageway approximates a circular shape. Thus, the projecting circular segment of the compressor deforms or deflects the diaphragm to conform to the cross section of the passageway to effectively block the passageway.

According to another feature of the present invention, the wedge-shaped portion and the projecting circular segment of the effective zone of the compressor may be guided by the slit arrangement in the housing part. As a result, the compressor is prevented from getting wedged or tilting when being moved to actuate the diaphragm between the open and closing positions, and the force is evenly spread across the effective zone onto the diaphragm to deflect the latter. Force peaks and force concentrations can be avoided and the service life of the diaphragm valve is enhanced.

According to another feature of the present invention, the compressor may be constructed to retract into an area of the slit arrangement in the open position of the diaphragm. In other words, the diaphragm is returned to a position in which it bears against the housing part to complete so that the passageway is essentially unobstructed.

According to another feature of the present invention, an actuator may be provided for manual, electric, hydraulic, and/or pneumatic operation of the compressor.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is an exploded sectional view of a diaphragm valve according to the present invention in open position;

FIG. 2 is an exploded perspective view of the diaphragm valve of FIG. 1;

FIG. 3 is an exploded sectional view of a diaphragm valve of FIG. 1 in closing position;

FIG. 4 is an exploded perspective view of the diaphragm valve of FIG. 3;

DETAILED DESCRIPTION OF PREFERRED EMBODIMENTS

Figure 5:
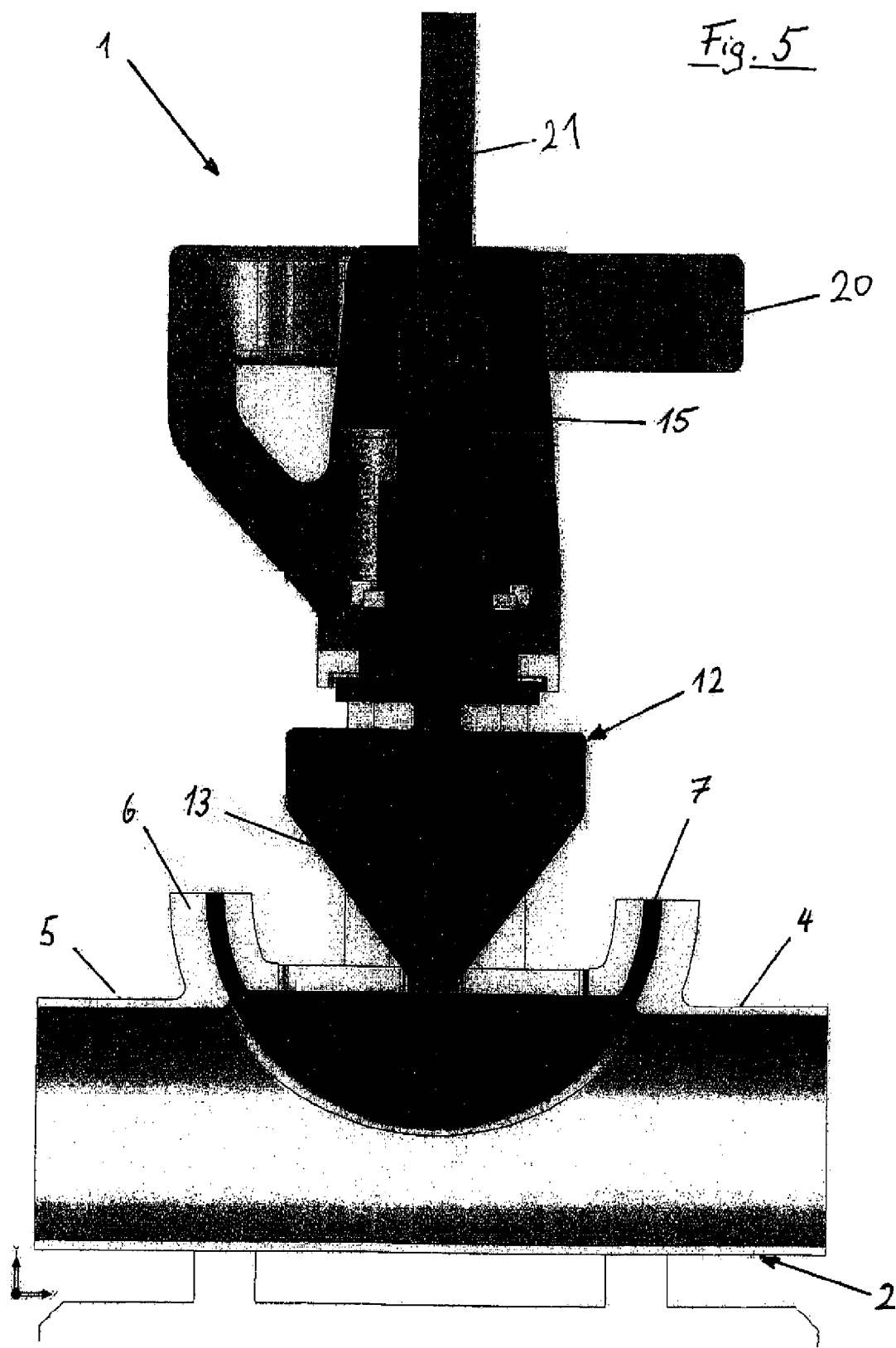
FIG. 5 is a schematic illustration of the diaphragm valve in open state.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exploded sectional view of a diaphragm valve according to the present invention, generally designated by reference numeral 1 and shown in open position. The diaphragm valve 1 has a valve body 2 which is made preferably of metallic material and defines a length axis 3. On opposite ends thereof, the valve body 2 is extended in direction of the length axis 3 by stubs 4, 5, respectively, for attachment to respective unillustrated pipes or tubes for conduction of a fluid, in particular a liquid. Fluids or liquids involved here are those used in the food and pharmaceutical industries for preparation of foodstuffs and pharmaceuticals, respectively.

The valve body 2 has a diaphragm holder 6 which has a configuration in the shape of a saddle, as shown in particular in FIG. 2. The holder 6 bounds an opening 17 in communication with an interior space of the valve body 2. The opening 17 has also a three-dimensional curved configuration and traverses a cylinder wall of the valve body 2. The holder 6 supports a diaphragm 7 having a configuration which complements the configuration of the holder 6 and thus has also the shape of a saddle. In the area of the diaphragm valve 1, the configuration of the diaphragm 7 conforms to the contour of the stubs 4, 5 so as to complete the passageway through the diaphragm valve 1. In midsection, the diaphragm 7 is arched in parallel relationship to the length axis 3 of the valve body 2 so that the fluid-proximal inner side of the diaphragm 7 forms part of the passageway cross section, when the diaphragm valve 1 assumes the open position, as shown in FIG. 5.

The diaphragm 7 is surrounded by a housing part 8 which is made preferably of metallic material and completes the passageway cross section in the area of the diaphragm valve 1. The housing part 8 has a configuration to conform to the diaphragm 7 and the holder 6 so that the passageway cross section is embraced completely about the circumference, when the valve body 2, the diaphragm 7 and the housing part 8 are connected together by screw bolts 9 for example. Thus, the clear cross section of the passageway of the diaphragm valve 1 is substantially of same size and as smooth as the cross section of the stubs 4, 5 of the valve body 2.

The housing part 8 has an arrangement of two slits 10, 11 which extend crosswise and thus perpendicular to one another. The slits 10, 11 are provided to guide a compressor 12 for operating the diaphragm 7, while at the same time securing the compressor 12 against rotation. The compressor 12 is hereby suitably connected to an adjustment member 15, such as a valve stem, of an actuating device, by which the compressor 12 can be moved in relation to the diaphragm 7 manually, electrically, hydraulically and/or pneumatically. The compressor 12 has a wedge-shaped portion 13 and a circular segment 14 which projects from the wedge-shaped portion 14, as shown in particular in FIG. 2. The slit 10 extends substantially in direction of the length axis 2 of the valve body 2 and is provided to guide the wedge-shaped portion 12 of the compressor 12. The slit 11 which extends perpendicular to the slit 10 is provided to guide the circular segment 14 of the compressor 12. As a consequence, the compressor 12 is effectively restrained against rotation by the slits 10, 11 as it moves in the direction of the diaphragm 7 to open and close the diaphragm valve 1.

Figure 6:
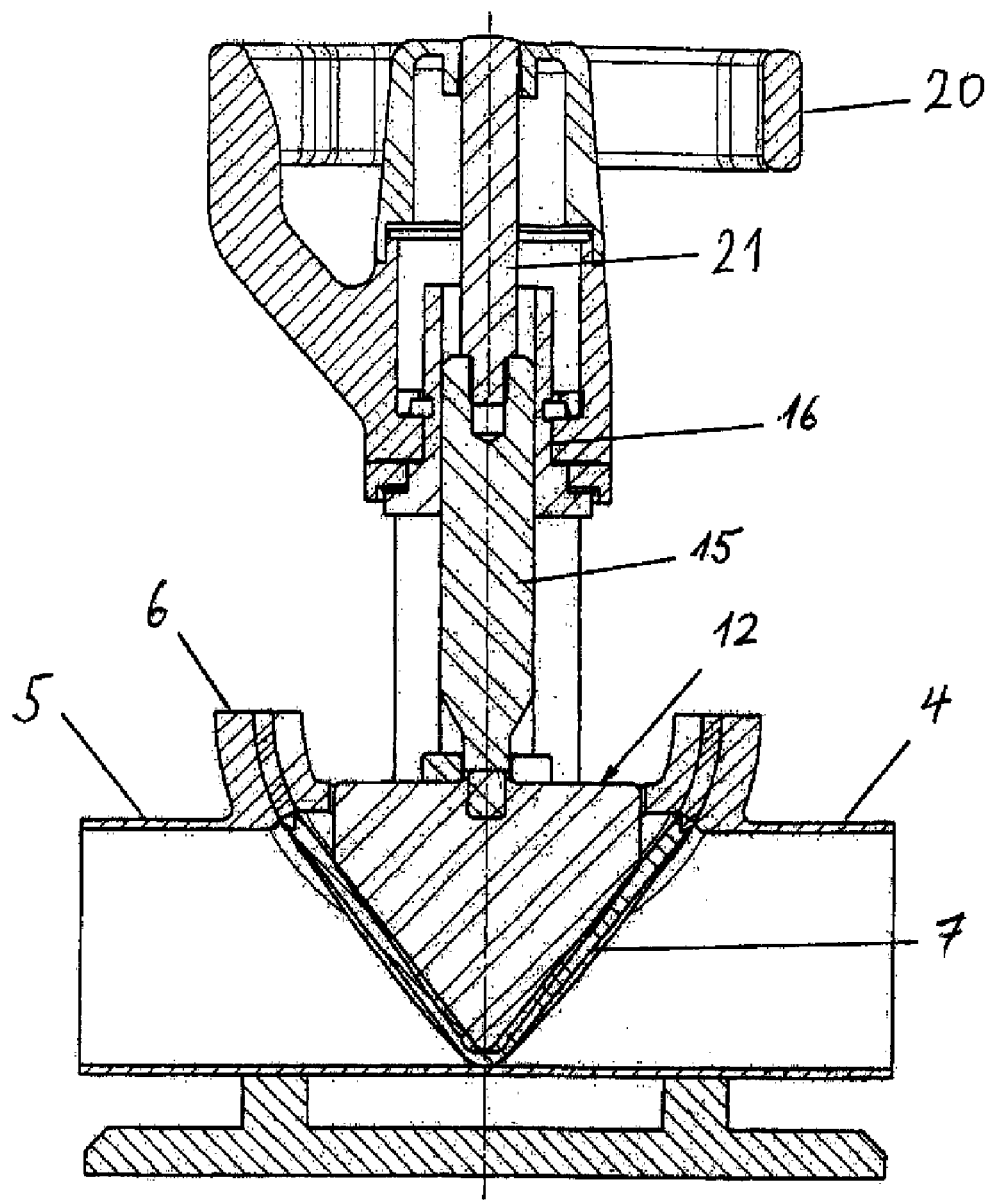
FIG. 6 is a schematic illustration of the diaphragm valve in closed state.

Further secured to the housing part 8, suitably by means of the screw bolts 9, is an intermediate piece 16 which is traversed by the actuator 15 and provides, for example, an abutment for the adjustment member 15. The adjustment member 15 may be operatively connected to a hand wheel 20 in case of a manual actuation, with the hand wheel 20 being connected to an indicating spindle 21 which is operatively connected to the adjustment member 15, as shown in FIGS. 5 and 6. As an alternative, the adjustment member 15 may be operatively connected to an electric, hydraulic, and/or pneumatic drive. The screw bolts 9 are thus used not only for clamping and securing the diaphragm 7 between the holder 6 of the valve body 2 and the housing part 8 but also for attachment of the intermediate piece 16 which receives the adjustment member 15.

When the diaphragm valve 1 assumes the open position, as shown in particular in FIGS. 2 and 5, the diaphragm 7 bounds part of the passageway cross section in the area of the valve body 2 so that the diaphragm 7 demarcates jointly with the valve body 2 the entire circumference of the passageway cross section with predefined dimensions which substantially match the dimensions of the stubs 4, 5. The compressor 12 of the diaphragm valve 1 is slightly pushed into the slits 10, 11, i.e. neither the wedge-shaped portion 13 nor the circular segment 14 of the compressor 12 applies any significant pressure force upon the diaphragm 7. Rather, the diaphragm 7 extends between the holder 6 and the housing part 8 in such a manner as to complete the passageway cross section in the opening 17. In other words, the diaphragm 7 has a configuration in the opening 17 in continuance of the body wall of the valve body 2 to realize a smooth inside wall surface of the passageway all-round. Thus, there is neither a dead space nor a cross sectional constriction when the diaphragm valve 1 assumes the open position. Fluid flowing through the diaphragm valve 1 is therefore contacted only by part of the diaphragm 7.

The diaphragm valve 1 and the passageway through the stubs 4, 5 of the valve body 2 and the connected pipeline can be cleaned for hygienic reasons, when contaminated, by means of cleaning bodies, called also scrapers, in the absence of any obstacle to interfere with the advance of the cleaning bodies through the diaphragm valve 1 and the pipeline, when the diaphragm valve 1 assumes the open position. The passageway through the diaphragm valve 1 is continuously smooth also in the area of the diaphragm valve 1 as a consequence of the interaction of the diaphragm 7 in cooperation with the holder 6 and the housing part 8. All areas of the diaphragm valve 1 and pipeline can be effectively cleaned in the absence of any significant dead spots.

FIGS. 3, 4 and 6 show the diaphragm valve 1 in closing position in which a flow of fluid is barred through the passageway of the valve body 2. This is implemented by actuating the adjustment member 15 to thereby move the compressor 12 and ultimately shift the diaphragm 7 to assume the closing position. The diaphragm 7 is hereby deflected by the wedge-shaped portion 13 and the circular segment 14 of the compressor 12 so as to flatly rest by means of the circular segment 13 about the circumference of the valve body 2 (cf. FIG. 6), which serves as valve seat, and to be pressed against the valve body 2 in this position. As a result, the passageway for a flow of fluid through the valve body 2 is effectively sealed through the interaction between the diaphragm 7, deflected by the compressor 12, and the associated areas of the valve body.

As can be seen in particular from the sectional view of the diaphragm valve 1 in FIG. 4, depicting the diaphragm 7 in closing position and completely deflected, the diaphragm 7 is preferably fixedly secured in midsection to the circular segment 14 of the compressor 12 by means of a tongue-and-groove joint in which a projecting pin 18 of the diaphragm 7 fits into a groove 19 in the wedge-shaped portion 13 of the compressor 12. As a result, the diaphragm 7 contacts and is pressed circumferentially against the valve body 2. As a consequence of the wedge-shaped portion 13 and the circular segment 14 of the compressor 12, the deflection force on the diaphragm 7 is applied over a relatively large surface area so that force concentrations and force peaks are prevented as the diaphragm 7 is acted upon by the compressor 12. This enhances service life. When the diaphragm valve 1 is closed, the diaphragm 7 in cooperation with the wedge-shaped portion 13 and the circular segment 14 of the compressor 12 is deformed to have a V-shaped cross section for cutting a fluid flow through the passageway. As soon as the adjustment member 15 operates the compressor 12 to move the diaphragm valve 1 to the open position, the diaphragm 7 returns to the initial configuration shown in FIG. 2 to allow an unimpeded flow of fluid.

As the wedge-shaped portion 13 and the circular segment 14 of the compressor 12 are guided by the slits 10, 11 in the housing part 8, the compressor 12 is able to retract into the area of the slits 10, 11 so that the diaphragm 7 completely clears the passageway cross section in the open position of the diaphragm valve 1.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated. Of course, this embodiment is shown by way of example only, and other configurations which generally follow the concepts outlined here are considered to be covered by this disclosure so long it is ensured that the compressor 12 is constructed to act on the diaphragm 7 in a predefined and reproducible way and deforms the diaphragm 7 to reach the closing position. The diaphragm 7 and the holder 6 may be modified to the situation at hand, optionally also the housing part 8. Possible modifications may also depend on the diameter of the passageway or diameter of the stubs 4, 5. Of course, fasteners or connectors other than the screw bolts 9 may be suitable as well. In certain cases, the need for the intermediate piece 16 may be eliminated, depending on the type of operation of the adjustment member 15.

What is claimed as new and desired to be protected by Letters Patent is set forth in the appended claims and includes equivalents of the elements recited therein:

1. A diaphragm valve, comprising:
   a valve body in the form of a cylinder defining a center line and having a passageway defined by a length axis, said valve body having a cross section which is substantially uniform from end to end in a direction of the length axis, said valve body formed with an opening which communicates with an interior space of the valve body and has a three-dimensional curved configuration, said opening traversing a cylinder wall of the valve body;

a diaphragm supported by a holder of the valve body, with the holder bounding the opening of the valve body in surrounding relationship on an outside of the valve body and following a contour of the opening so as to have a configuration in the shape of a saddle in a direction of the length axis of the passageway, said holder being sized to extend to the center line of the valve body; and a compressor for moving the diaphragm on the holder between a closing position in which the diaphragm is forced through the opening to bar a flow of fluid through the passageway as the diaphragm is caused by the compressor to seal a valve seat formed by the cylinder wall of the valve body, and an open position in which the diaphragm covers the opening by substantially complementing the cylindrical configuration of the valve body to thereby enable a flow of fluid through the passageway substantially without narrowing the cross section of the passageway.

2. The diaphragm valve of claim 1, constructed to allow a cleaning member to move through the passageway for cleaning purposes.

3. The diaphragm valve of claim 1 for use in food and pharmaceutical industries.

4. The diaphragm valve of claim 1, further comprising a housing part for completing the cross section of the passageway and circumscribing the diaphragm on a fluid-distal side of the holder.

5. The diaphragm valve of claim 4, wherein the diaphragm is clamped between the holder and the housing part.

6. The diaphragm valve of claim 4, wherein the diaphragm has a configuration which is suited to a configuration of the holder and the housing part and bounds the passageway in the open position of the diaphragm.

7. The diaphragm valve of claim 4, wherein the compressor and the housing part are constructed to secure the compressor against rotation when the compressor operates the diaphragm to move between the open and closing positions.

8. The diaphragm valve of claim 7, wherein the housing part is formed with a slit arrangement having at least two slits extending perpendicular to one another for securing the compressor against rotation.

9. The diaphragm valve of claim 8, wherein at least one of the slits extends approximately in the direction of the length axis.

10. The diaphragm valve of claim 1, wherein the compressor is constructed to have an effective zone interacting with the diaphragm such that the diaphragm is urged in the closing position against an inner wall surface of the passageway.

11. The diaphragm valve of claim 10, wherein the effective zone of the compressor has a configuration conforming to a configuration of the cross section of the passageway.

12. The diaphragm valve of claim 10, wherein the effective zone of the compressor is constructed to have a wedge-shaped portion for flat contact upon the diaphragm.

13. The diaphragm valve of claim 10, wherein the effective zone of the compressor is constructed to have a projecting circular segment to complement the cross section of the passageway.

14. The diaphragm valve of claim 10, wherein the housing part is formed with a slit arrangement having at least two slits to secure the compressor against rotation when the compressor operates the diaphragm to move between the open and closing positions, said effective zone of the compressor being guided by the slit arrangement.

15. The diaphragm valve of claim 10, wherein the compressor is constructed to retract into an area of the slit arrangement in the open position of the diaphragm.

16. The diaphragm valve of claim 1, further comprising an actuator for operating the compressor manually, electrically, hydraulically, and/or pneumatically.

* * * * *